(12) United States Patent
O'Dunlaing et al.

(10) Patent No.: US 6,719,556 B2
(45) Date of Patent: Apr. 13, 2004

(54) OPHTHALMIC MOLD HANDLING SYSTEM

(75) Inventors: Eoin O'Dunlaing, Dublin (IE); Michael Brodie, Charleville (IE); Oran F. K. McGrath, Drinagh (IE); Hugh Michael Morris, Waterford (IE)

(73) Assignee: Bausch & Lomb Incorporated, Rochester, NY (US)

( * ) Notice: Subject to any disclaimer, the term of this patent is extended or adjusted under 35 U.S.C. 154(b) by 221 days.

(21) Appl. No.: 10/015,463

(22) Filed: Dec. 12, 2001

(65) Prior Publication Data

US 2003/0108637 A1 Jun. 12, 2003

(51) Int. Cl.[7] ............................................... B29D 11/00
(52) U.S. Cl. ........... 425/556; 425/436 R; 425/436 RM; 425/808
(58) Field of Search ............................. 425/556, 436 R, 425/436 RM, 808

(56) References Cited

U.S. PATENT DOCUMENTS

| | | | |
|---|---|---|---|
| 3,660,545 A | 5/1972 | Wichterle | 264/1 |
| 3,669,089 A | 6/1972 | Swenson | 125/11 R |
| 4,568,501 A * | 2/1986 | Wichterle et al. | 264/2.1 |
| 5,466,147 A | 11/1995 | Appleton | 425/412 |
| 6,197,227 B1 * | 3/2001 | Appleton et al. | 264/1.1 |

FOREIGN PATENT DOCUMENTS

EP 0882560 A2 12/1998 ........... B29C/37/00

* cited by examiner

Primary Examiner—James P. Mackey
Assistant Examiner—Donald Heckenberg
(74) Attorney, Agent, or Firm—Katherine McGuire (57) ABSTRACT

A handling assembly for ophthalmic mold parts between processing stations of a manufacturing line comprises a planar mold cartridge adapted to hold about 1000 mold parts at a time.

5 Claims, 8 Drawing Sheets

FIG. 10 ively, side elevational view of a plurality
OPHTHALMIC MOLD HANDLING SYSTEM

BACKGROUND OF THE INVENTION

The present invention generally relates to industrial automated material handling, and more particularly relates to methods and apparatus for handling ophthalmic mold parts in a lens manufacturing line. The present invention has particular application to the production of molded ophthalmic lenses such as contact lenses and intraocular lenses, for example.

There are basically two methods of molding a contact lens, full cast molding and spincasting where one one surface is molded and the opposite surface is lathed. In full cast molding, a single mold unit for making a single lens comprises a female mold section having a concave optical surface and a male mold section having a convex optical surface. A quantity of liquid lens material is dispensed into the concave optical surface of the female mold section and the male mold section is seated upon the female mold section with the concave and convex surfaces thereof facing one another to form a lens-shaped mold cavity. The joined female and male mold sections form a single mold unit which is subject to a curing cycle (e.g., by thermal or UV radiation) thereby causing polymerization of the lens material in the mold cavity. Once the lens material has cured, the male and female mold sections are separated to retrieve the cured lens. See, for example, U.S. Pat. No. 5,466,147 issued to Bausch & Lomb Incorporated, the entire reference of which is incorporated herein by reference.

Examples of spincasting (also termed centrifugal casting) are disclosed in U.S. Pat. Nos. 3,660,545 and 3,669,089. In conventional spincasting processes, a liquid polymerizable mixture is charged, generally via injection, to a female mold having a concave molding surface, and the mixture is polymerized while the mold is rotated. The polymerizable mixture can be exposed to polymerizing radiation, such as ultraviolet radiation, and/or heated during rotation of the mold to facilitate polymerization. The produced lens has a convex lens surface shaped by the female concave molding surface and the opposite concave lens surface is shaped by centrifugal force generated by rotation of the mold and surface tension of the mixture contained in the mold.

There are many prior art methods of handling the lens mold parts through a lens manufacturing line, whether it be both the female and male parts in a full cast molding operation, or just the female mold parts in a spincasting manufacturing line. The mold parts are typically injection molded in a mold machine and transferred to a mold holder which may advantageously also function as a mold dispenser at the monomer filling station. One prior art mold holder and dispenser is in the form of an elongated cylindrical tube in which the mold parts are stacked one upon the other. The tube has an open top into which the mold parts are deposited by the pick-and-place head of the mold injection mold machine. The tube also has an open bottom which is temporarily closed with a stopper when depositing molds parts into the tube at the top opening thereof. Once a tube is full, a worker manually retrieves the tube from the mold injection station and places it at the monomer fill station. Since each tube is able to hold only about 100 mold parts each, the amount of time a worker spends changing over empty and full tubes to and from the mold depositing station and the monomer fill station is excessive. The tubes also require cleansing in order to be reused which is difficult and time consuming in that the inside surfaces of the cylindrical tube must be scrubbed clean. There therefore remains a need for an improved method of handling mold parts between manufacturing stations which reduces the amount of time on mold part handling and thus provides cost improvement.

SUMMARY OF THE INVENTION

The present invention addresses the above deficiencies of the prior art by providing a system for handling mold parts in an ophthalmic lens manufacturing line wherein the mold handling system is adapted to hold a larger amount of mold parts at a time (e.g., preferably on the order of at least about 1000 (one thousand) mold parts) in a single mold holder or cartridge.

In a first aspect of the invention, a mold cartridge is provided which is preferably of a generally rectangular configuration having spaced front and rear walls which define an internal cavity wherein the mold parts are arranged in side-by-side fashion. Since the cavity for the mold parts is of a large, generally planar shape, there is much more space available to hold mold parts than in the prior art design of a cylindrical mold tube.

In another aspect of the invention, the mold parts are automatically deposited into the mold cartridge by a pick-and-place mold transfer head which picks the mold parts from the injection mold machine which makes the mold parts. A mold drop plate is provided which includes features that align with the mold locations of the mold transfer head. Thus, as molds are formed in the injection mold machine, the mold transfer head picks the molds therefrom and deposits them into the drop plate which is configured to relay the mold parts using force of gravity into a mold cartridge in the correct orientation. This continues until the cartridge is full, at which time an operator takes the full cartridge from the mold machine station to the monomer fill station or a waiting area where the molds are allowed to stabilize for a predetermined amount of time. Of course rather than a worker transferring the mold cartridge between stations, this step in the process may also be automated using robotic handling, if desired.

In yet a further aspect of the invention, the mold cartridge is mounted to a fixture for dispensing molds at the monomer fill station. The mold cartridge feeds molds to the fixture which is adapted to direct mold parts exiting from a bottom exit port in the cartridge to an appropriate mold position at the monomer fill station. Since the present invention is useful for a variety of lens manufacturing methods which utilize mold parts (e.g., spincasting, full cast molding and toric cast molding (where one mold part is rotated relative to a mating mold part), the configuration of the monomer fill station likewise may vary.

DETAILED DESCRIPTION

Figure 1:
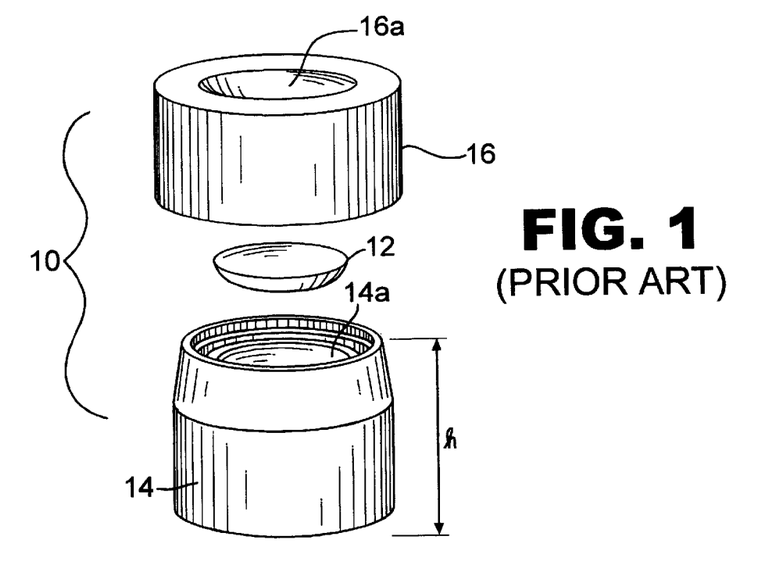
FIG. 1 is a perspective view of a prior art contact lens mold comprising a male mold section spaced above a lens and a female mold section.

Referring to FIG. 1, a prior art mold 10 for cast molding an ophthalmic lens 12 is seen to comprise a female mold section 14 having a concave optical surface 14a and a male mold section 16 having a complimentary shaped convex mold surface (not seen but located opposite concave top surface 16a). In cast molding an ophthalmic lens 12, a liquid lens material is dispensed into the concave surface 14a of the female mold section 14. The male mold section 16 is seated upon the female mold section 14 until the mold surfaces 14a,16a thereof are closely adjacent. U.S. Pat. No. 5,466,147 discloses such a mold for molding lenses, especially contact lenses. Upon polymerization, the lens material between the mold surfaces 14a,16a is cured to form a lens 12 which is retrieved for further processing as required (e.g., hydration, extraction, sterilization and packaging).

Referring now to FIGS. 2 and 3a–d, a mold cartridge 18 for holding a plurality of mold parts such as female mold parts 14 is shown. Although the description herein relates to handling of female mold parts between stations of a spin-casting manufacturing line, it is understood that the invention may be utilized for handling other mold parts including male mold parts 16 in full cast molding manufacturing lines. It is also understood that molds for ophthalmic lenses as that term is used herein includes molds for making both contact lenses and intraocular lenses.

Figure 2:
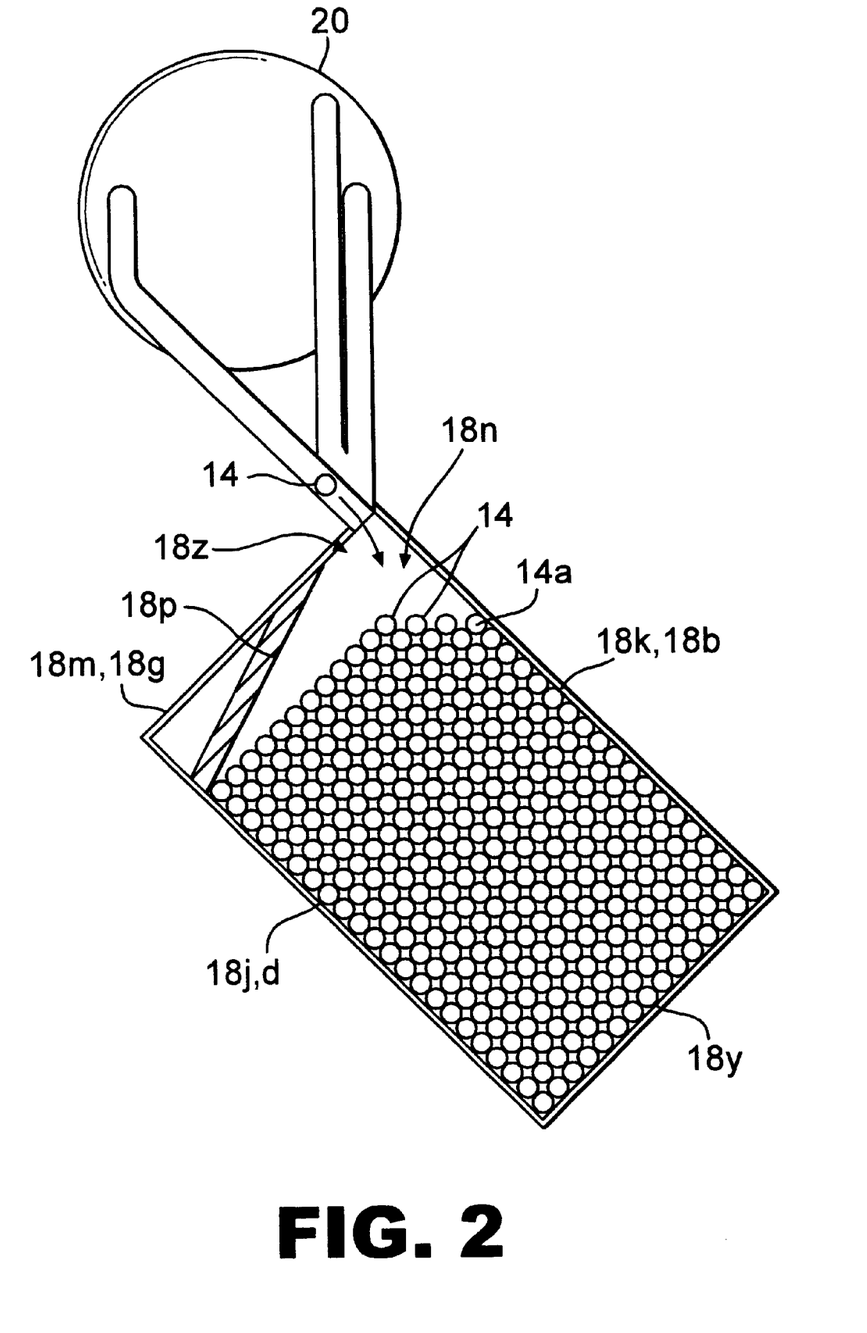
FIG. 2 is an elevational diagramatic view of a mold cartridge being filled with mold parts.
Figure 3A:
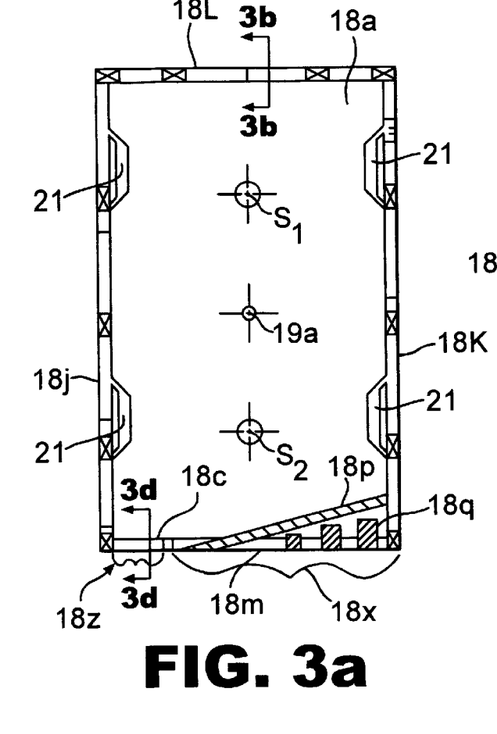
FIGS. 3a,b and 3c,d are plan views of the front and back cartridge panels, and cross-sectional views thereof taken through lines 3b—3b and 3d—3d of FIG. 3a, respectively.
Figure 3B:
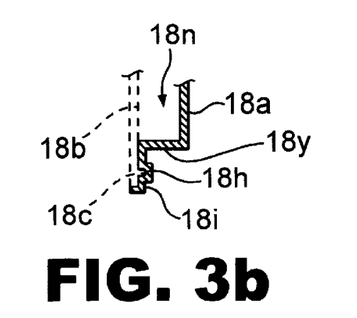
Figure 3C:
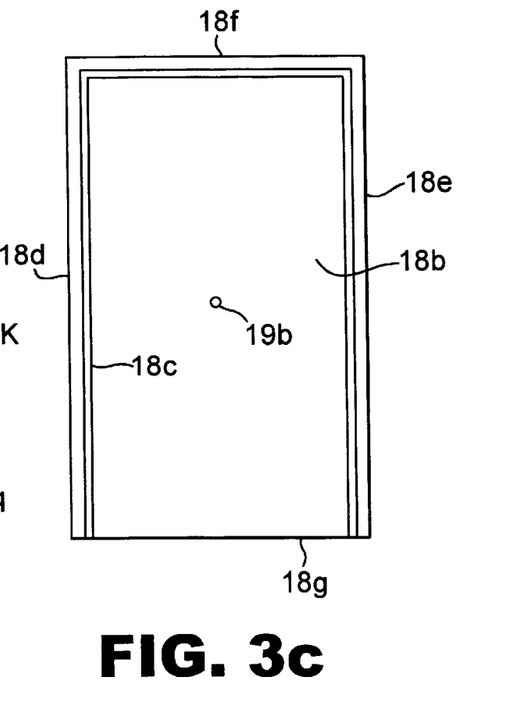
Figure 3D:
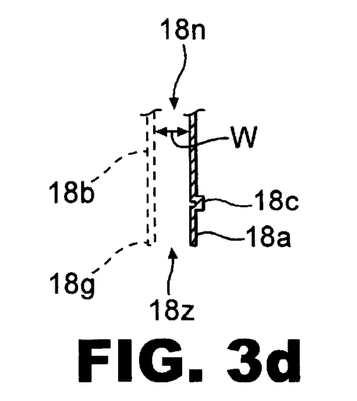

FIG. 3a shows the front panel 18a of cartridge 18 while FIG. 3c illustrates the back panel 18b. Back panel 18b includes a flange 18c which extends parallel and adjacent opposite side edges 18d, 18e and top edge 18f but not bottom edge 18g. As seen in the cross-sectional view of FIG. 3b, front panel 18a includes a channel 18h formed along a double right angle projection 18i of the front panel edge which extends along opposite panel side edges 18j,k and top edge 18L but not bottom edge 18m. Thus, front panel 18a may be releasably secured to back panel 18b by snap-fitting flange 18c into channel 18h along the opposite side edges and top edges thereof, respectively. To further enhance securement of the front and back panels, one or more releasable snap-fit peg and hole elements 19a, 19b secured to the facing surfaces of the front and back panels, respectively, may be provided generally at the center of cartridge 18. One or more spacer elements $S_1$ and $S_2$ may also be provided along the longitudinal center line of the panels to assist in maintaining a consistent spacing between the front and back panels about internal cavity 18n. Spacer elements $S_1$ and $S_2$ may be integrally vacuum formed in front panel 18a as discussed in more detail below. In the preferred embodiment of the invention, the width or spacing w between the front and back panels (FIG. 3d) is slightly larger than the height h of the mold part 14 (FIG. 1), or other mold part being used. As such, as mold parts are dispensed into the cartridge, they will stack upon each other in a single layer as seen in FIG. 2 with their outer cylindrical wall surfaces touching each other.

It will be appreciated that front and back panels 18a,18b are easily attached together and then separated to permit easy cleaning of the interior surfaces thereof between molding cycles. Once clean, they are attached together again for the next molding cycle. Maintaining clean interior surfaces of the cartridge is very important in a lens molding operation since debris can otherwise transfer over to the molding surfaces of the mold parts which then transfers to the finished lens.

In the preferred embodiment, front and back panels 18a,b are made of a transparent plastic material to be able to view the internal cavity thereof, although other materials are possible. Front panel 18a may advantageously be vacuum formed to permit integral molding of the elements thereon. For example, front panel 18a may be provided with integrally formed handles 21 adjacent opposite side edges thereof to facilitate manual handling of the cartridge. Other elements of front panel 8a will be discussed below.

Figure 7A:
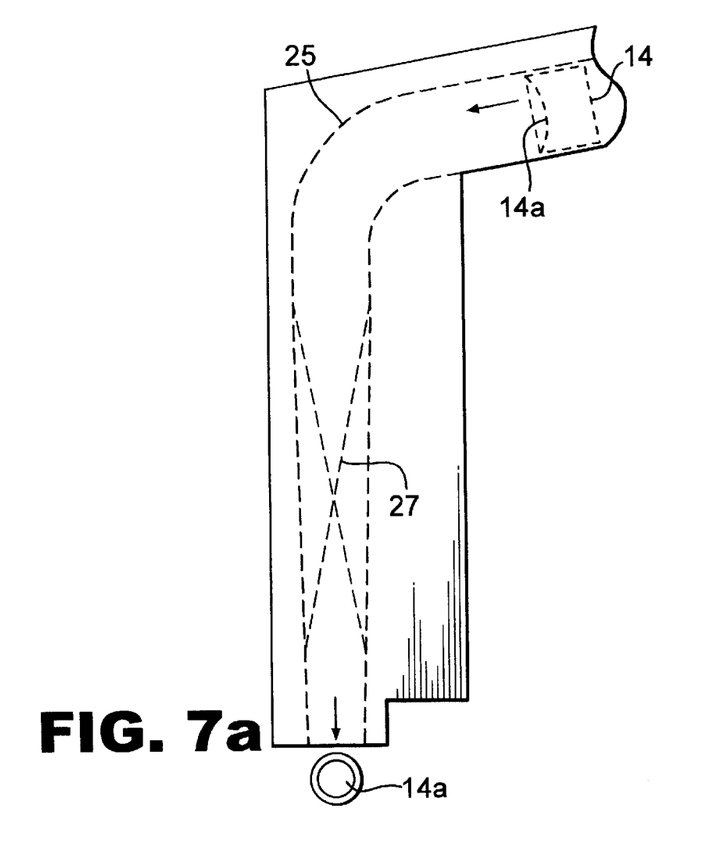
FIG. 7a is a side-elevational view of a mold part channel.
Figure 7B:
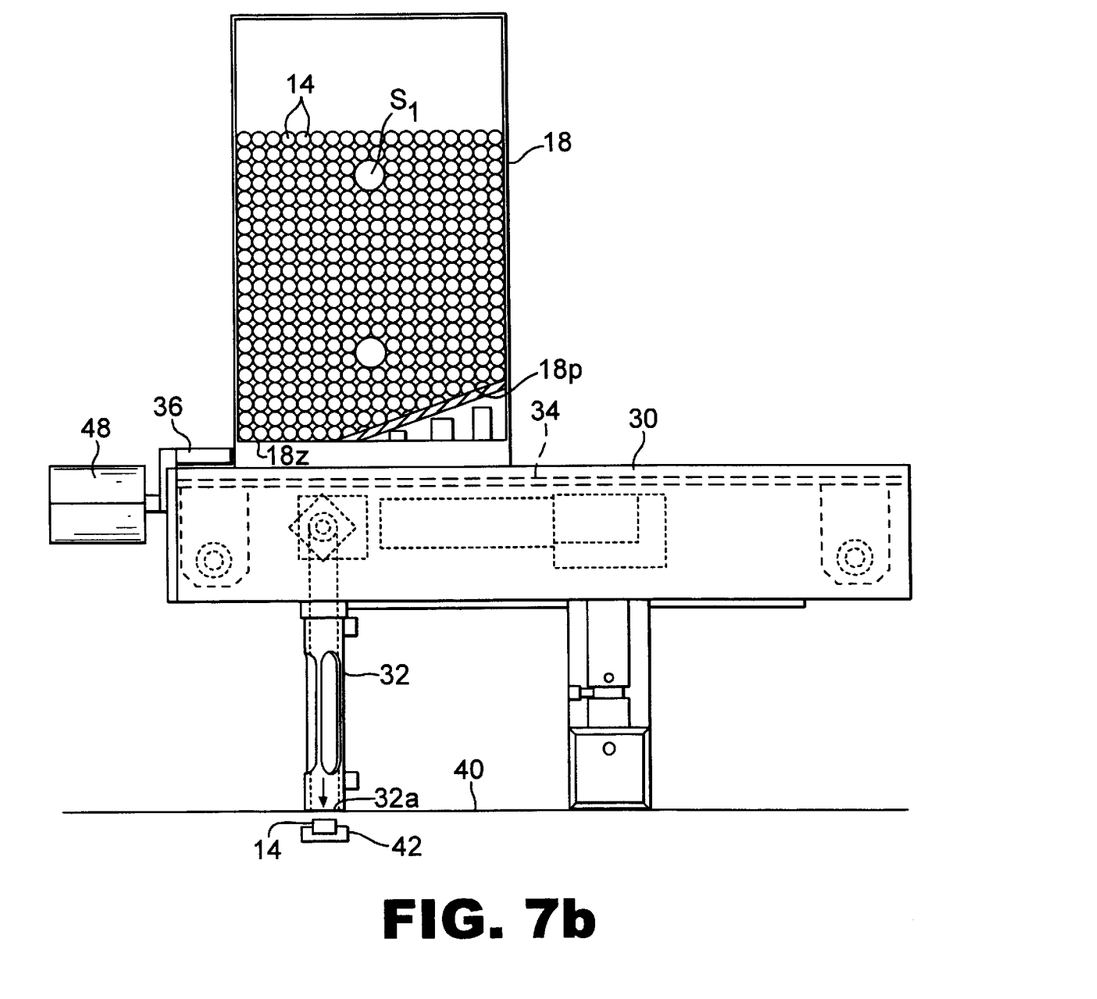
FIG. 7b is a side elevational view of the mold cartridge mounted for dispensing mold parts at the monomer filling station.

To facilitate mold parts exiting from cartridge 18 by gravity at the monomer filling station, a ramp 18p is integrally formed in front panel 18a which extends the entire width w of cavity 18n whereby once cartridge 18 has been inverted and mounted to the monomer filling station (see FIG. 7), the mold parts 14 may ride downwardly along ramp 18p toward open end 18z. The provision of ramp 18p prevents the mold parts 14 from becoming stuck in an immovable stack within the cartridge. Spacer elements $S_1$ and $S_2$ also aid the mold parts in moving downwardly within the cartridge in this regard.

Thus, from the foregoing, it will be appreciated that while the opposite side edges and top edge of the panels are completely closed as at 18y when secured together (see FIG. 3b), the bottom edges are open at segment 18z which opens to internal cavity 18n of the cartridge (see FIG. 3d) while ramp 18p effectively closes the remaining bottom segment 18x. Thus, at the mold injection station, the bottom edges 18m,18g of cartridge 18 are facing upwardly to receive molds from the mold drop plate 20 which directs the molds to drop through opening 18z into open cavity 18n wherein they are held in cartridge 18 (see also FIG. 2). One or more integral ribs 18q may be formed in front panel 18a to increase rigidity of front panel 18a in the area beneath ramp 18p.

Figure 4:
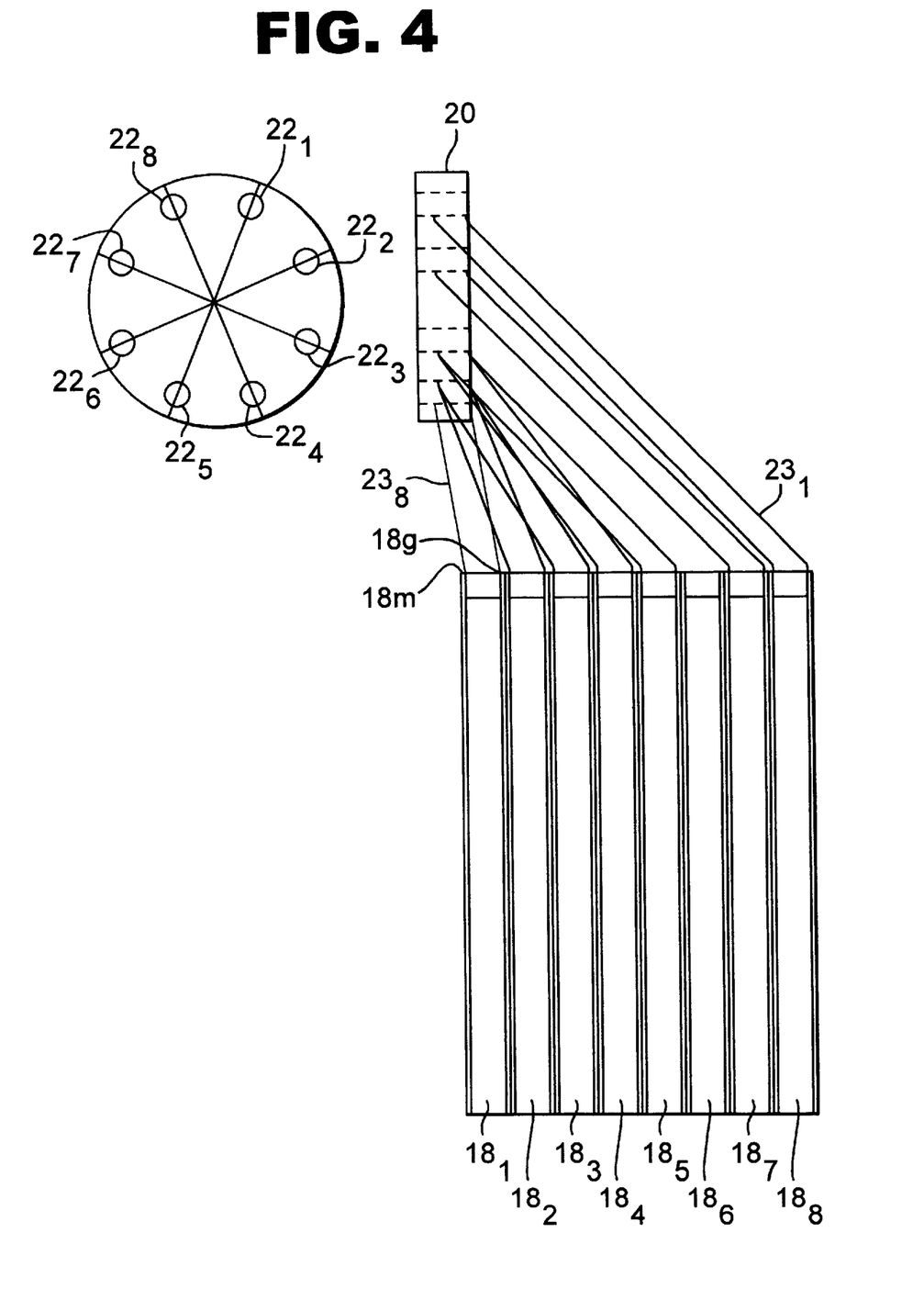
FIG. 4 is a diagramitc, side elevational view of a plurality of cartridges being loaded with mold parts from a mold drop plate.
Figure 5:
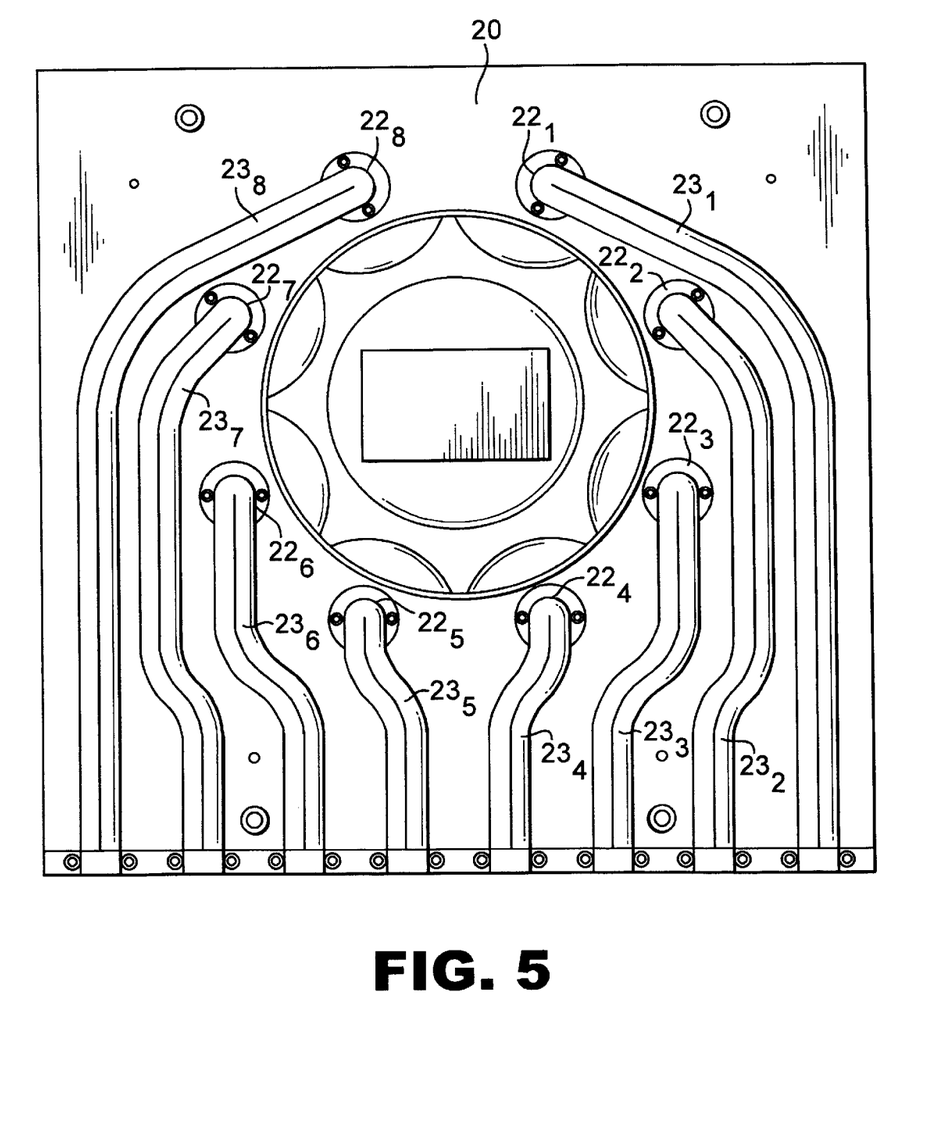
FIG. 5 is a plan view of the mold drop plate.

As seen in FIGS. 4 and 5, mold drop plate 20 includes a circular array of circular openings $22_1$ through $22_8$ which are connected to respective drop channels $23_1$ through $23_8$. The bottom openings of channels $23_1$ through $23_8$ align with the open bottom edges 18m, 18g of eight cartridges $18_1$ through $18_8$, respectively, placed in side-by-side relationship as seen in FIG. 4. In operation, a robotic mold pick-and-place head (not shown) retrieves newly injection molded mold parts 14 from the injection mold machine (also not shown) and transfers them, eight at a time, to the mold drop plate 20. The array of openings $22_1$ through $22_8$ in the mold drop plate align with the mold locations on the pick-and-place head whereby eight mold parts are deposited into the mold drop plate at a time. Each mold part will travel through a respective channel $23_1$ through $23_8$ and deposit in a respective cartridge $18_1$ through $18_8$ by the force of gravity. Thus, eight cartridges may be filled with mold parts at a time which allows an eight time increase in the amount of time between mold cartridge full-to-empty exchanges. In this regard, it is noted that to achieve an eight cartridge design for mold part depositing, the cartridges are oriented at a 90 degree angle relative to the plane in which the array $22_1$ through $22_8$ lies. Referring to FIG. 7a, in order to turn the mold parts 14a into the correct orientation prior to entering a cartridge 18, a tube 25 having a 90° configuration twist 27 formed therein is provided in mold part channels $23_1$ through $23_8$. Thus, as the mold parts are being released by the pick-and-place head in a respective opening $22_1$ through $22_8$, the mold parts 14a enter a respective mold channel $23_1$ through $23_8$ in the orientation seen at the top of FIG. 7a, with the optical molding surface 14a thereof directed along the longitudinal opening of the channel, travelling in the direction of the arrow. Once mold part 14 passes through 90° twist 27, the mold part 14 is turned 90° such that the optical surface 14a will face toward either the front 18a or back panel 18b of the cartridge, depending on which way the cartridge is placed beneath the drop plate 20. In this way, all mold parts 14 will be stacked in the correct orientation in a respective cartridge 18 as seen in FIG. 2.

A computer (not shown) may be connected to the injection mold machine and pick-and-place head and include a mold part counter which calculates how many mold parts have been deposited into each cartridge. In the preferred embodiment described herein, each cartridge can hold 1000 mold parts, although this may vary depending on the desires of the user. Thus, once 1000 mold parts have been deposited into each mold cartridge $18_1$ through $18_8$, a signal is generated by the computer telling the operator the cartridges are full and should be exchanged with empty cartridges.

Figure 6:
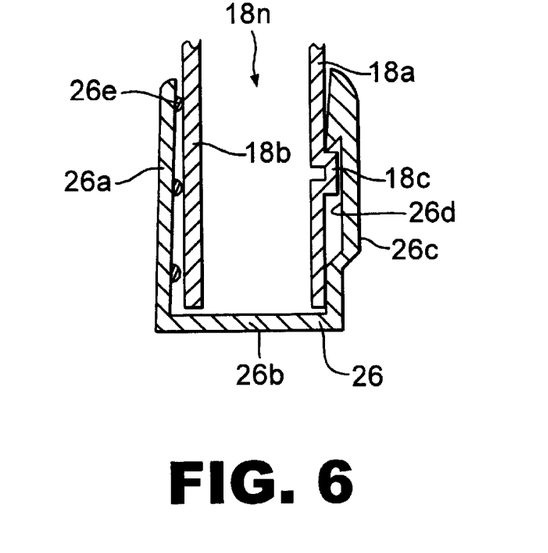
FIG. 6 is a cross-sectional view of the cap secured to the open bottom of the cartridge.

Once the cartridges have been fully charged with mold parts as explained above, an operator attaches a cap 26 to cartridge open end 18z as seen in FIG. 6. Cap 26 is elongated and has a generally U-shaped cross-section having three interconnected walls 26a,26b,26c. Cap 26 may be removably attached to open end 18z of a cartridge 18 by positioning one end of cap 16 at a corner of the cartridge adjacent open end 18z thereof, and sliding cap 26 along the opposite bottom panel edges 18g, 18m with flange 18c on front panel 18a inserted into channel 26d of cap 26. One or more bumps 26e may be provided on the inwardly facing surface of cap wall 26a to reduce friction in this area and thus permit an easy sliding attachment of cap 26 to cartridge 18. Thus, once a cartridge has been fully charged with mold parts at the injection molding station as described above, the open end 18z of the cartridge may be closed to prevent mold parts 14 from falling out of the cartridge when moving the cartridge from the mold injection station to the monomer filling station. Once a full cartridge is at the monomer filling station, the cap 26 may be removed as discussed in more detail below.

Discussion is now turned to the manner by which mold parts are dispensed from the cartridge at the monomer filling station. Referring to FIG. 7b, a mold dispensing table 30 is provided which is mounted adjacent the monomer filling table 40. Generally speaking, a full cartridge 18 is mounted to dispensing table 30 with open end 18z thereof aligned with a mold part exit chute 32 which extends downwardly with the opposite, open end 32a of exit chute 32 aligned with a mold part locator 42 in monomer dispensing table 40. As mentioned previously, monomer dispensing table may be a spincasting table, for example, having a rotatable carousel upon which the individual mold part locators 42 are positioned, although the invention may be easily adapted to any type of mold dispensing set-up simply be aligning the exit chute of the dispensing table with the mold part locator of the monomer filling station. Means for synchronizing mold part dispensing into respective mold part locators on table 40 is also provided and this is explained below.

Figure 8:
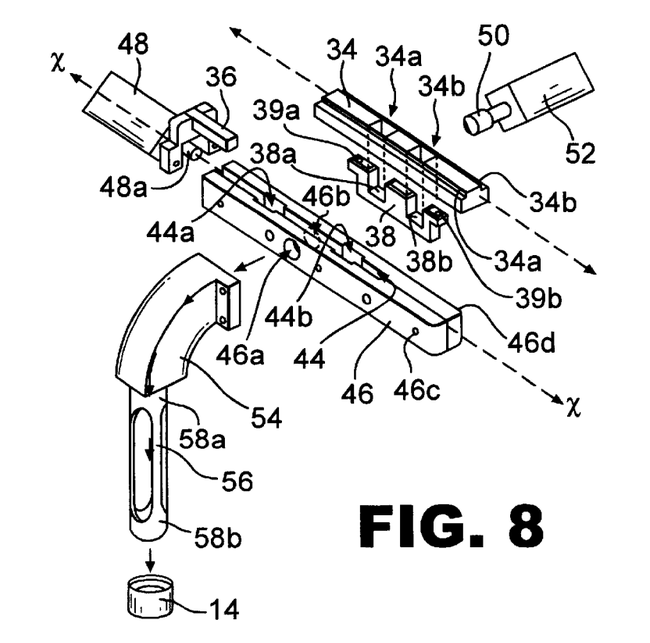
FIG. 8 is an exploded view of the mold part oscillating unit.
Figure 9:
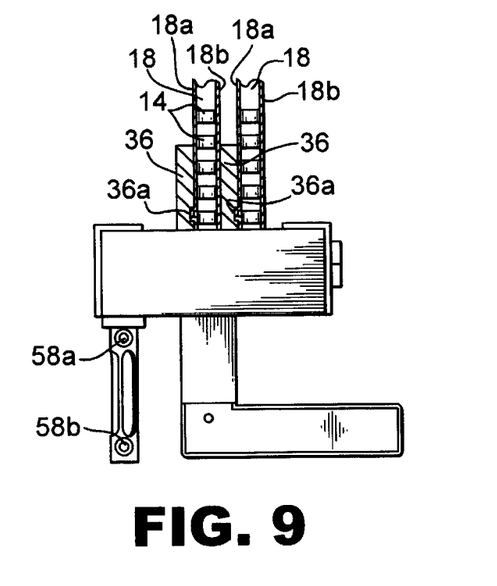
FIG. 9 is an end view of FIG. 7.
Figure 10:
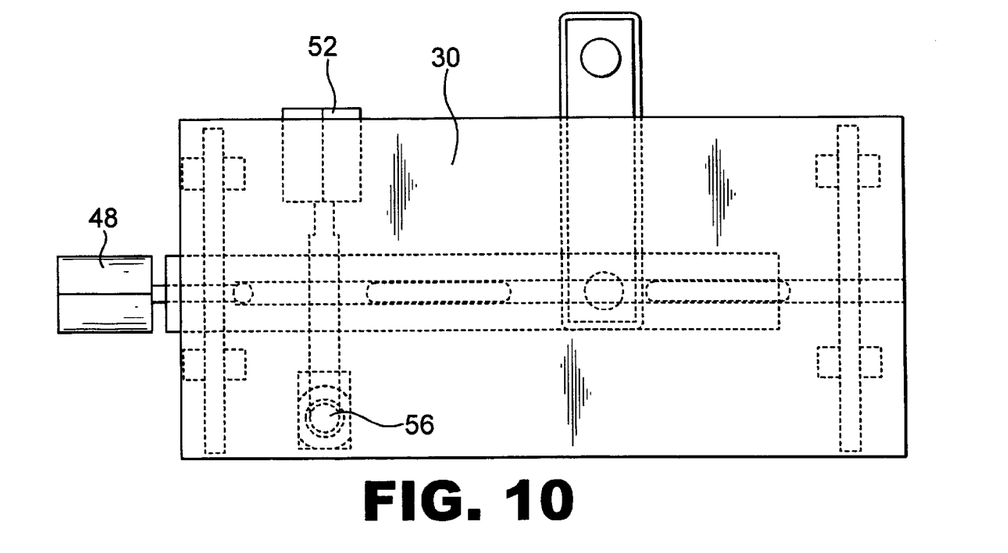
FIG. 10 is a top plan view of FIG. 7.

Attention is now turned to the manner by which mold parts 14 dispense from cartridge 18, travel through exit chute 32 and become located in a respective mold part locator 42 on table 40. Referring to FIGS. 8 and 9, an operator will invert a full cartridge retrieved from the mold injection molding station such that the open segment 18z thereof is now facing downwardly. Since cap 26 has been placed thereon, no mold parts will fall out of opening 18z. An operator then begins by aligning the bottom edges 18g,18m of the back and rear cartridge panels 18b,18a, respectively, with opposite grooves 34a,34b of an oscillating unit 34 on table 30, and while also aligning flange 18c of front panel 18a with longitudinal slot 36a formed in a cartridge support panel 36. This serves the purpose of securing the cartridge on oscillating unit 34 and also prevents an operator from inserting a cartridge the wrong way onto oscillating unit 34. The operator continues to push the cartridge onto oscillating unit 34 while at the same time sliding cap 26 in the opposite direction. Once cartridge opening 18z is on oscillating unit 34, the cap may be fully removed from its respective cartridge.

As seen in FIG. 9, it is preferred that at least two cartridges 18 are placed in side-by-side relationship in this manner on table 30 so as to enable a quick changeover to the adjacent cartridge once a working cartridge is emptied of mold parts.

A stop 36 is provided at the left end of table 30 which the leading corner of cartridge 18 engages when fully pushed onto unit 34. Once the leading edge of the cartridge engages the stop, the operator knows the cartridge is fully inserted onto unit 34.

In the fully inserted position of the cartridge, the open end 18z is aligned to direct molds from the cartridge to oscillating unit 34. As seen best in FIG. 8, oscillating unit 34 includes a pair of longitudinally spaced through holes 34a, 34b wherein a respective pair of mold parts 14 will drop into. Through holes 34a,34b align with a respective pair of mold ports 38a,38b in a mold capture unit 38. The oscillating unit 34 and mold capture unit 38 mount to each other through an elongated slot 44 formed in a stationary housing 46 with oscillating unit 34 on top of housing 46 and mold capture unit 38 beneath housing 46. Since oscillating unit and mold capture unit 34, 38 are attached to each other through stationary housing slot 44, they are slidable along housing axis x—x. An oscillating cylinder 48 is provided having a piston 48a is attached to oscillating unit 34 to impart the oscillating movement to unit 34 and thus also mold capture unit 38.

It is noted that housing slot 44 has two areas 44a and 44b which are wider than the remainder of the slot. The width of areas 44a,44b is slightly larger than the corresponding height h of a mold part 14 whereby a mold part 14 may pass through areas 44a,44b but not through the remainder of slot 44. Thus, the path a mold part will take from cartridge 18 to mold part locator 42 on the monomer filling table 44 is as follows. Cartridge opening 18z is several times wider than a mold part such that a plurality of mold parts 14 may exit therethrough at a time. As the mold parts 14 drop through opening 18z, they encounter oscillating unit 34 upon which cartridge 18 is mounted. The cartridge remains stationary while the oscillating unit 34 moves back and forth along axis x—x. A pair of mold parts will then drop into respective through holes 34a,34b in the oscillating unit 34, pass through enlarged slot area 44a,44b, and become trapped in mold capture ports 38a,38b. A pair of laterally aligned through holes 46a,46b are provided in side walls 46c,46d of housing 46, respectively, wherethrough a piston 50 of a cylinder 52 may alternately extend and retract. Thus, as oscillating unit 34 moves back and forth along axis x—x of housing 46, mold capture ports 38a,38b are alternately presented between through holes 46a,46b at which time piston 50 extends to push the mold part 14 held in a respective capture port, through hole 46a and into gooseneck 54 and exit chute 56, ending up in a respective mold locator 42 on monomer filling table 40. The firing of piston 50 is timed with the indexed rotation of the mold locators 42 on the carousel or other mold handling device (not shown) on table 40 such that the mold parts 14 are dispensed into a respective mold locator 42 in a continuously aligned and timed fashion. If desired, one or more proximity sensors 58a,58b may be provided in longitudinally spaced fashion along exit chute 56 to provide a signal when a certain amount of time passes between firing of piston 50 and a "no mold part" situation inside exit chute 56. This signal can further generate a response on table 30 for a switch to be made to the next adjacent, full cartridge which may be done either automatically or manually.

From the foregoing, it will be appreciated that the present invention provides an improved method and apparatus of handling mold parts between processing stations in a manufacturing line. While the invention has been described with regard to preferred embodiments thereof, it will be appreciated to those skilled in the art that various modifications may be made thereto without departing from the full spirit and scope of the invention as is defined in the claims which follow.

What is claimed is:

1. An assembly for handling mold parts in an ophthalmic lens manufacturing line between a mold part injection molding station and a mold part monomer filling station, said assembly comprising:

a.) a mold cartridge for holding and dispensing mold parts therefrom, said mold parts having a height h, said cartridge having front and back panels spaced from each other to define an internal cavity having a width w slightly larger than the height h of said mold parts whereby said mold parts may be dispensed into said cartridge at said injection molding station and become stacked within said cartridge in a side-by-side, substantially planar relationship, said mold cartridge further including an open end wherethrough said mold parts may enter and exit said internal cavity; and b.) a mold drop plate located adjacent said mold part injection molding station, said mold drop plate having at least one mold part opening and a respective channel having opposite top and bottom ends, said channel connected at said top end thereof to said mold part opening of said drop plate and at said bottom end thereof to said open end of said cartridge, whereby a mold part may be deposited into said mold part opening and drop by gravity through said channel and into said internal cavity of said cartridge.

2. The assembly of claim 1, and further comprising:

a.) a mold part dispensing table having an exit chute having opposite top and bottom open ends with said exit chute top open end connected to said cartridge open end and said exit chute bottom open end aligned with a mold part location element of said monomer filling station whereby mold parts may dispense by gravity from said cartridge open bottom, travel through said exit chute and become seated upon said mold part location feature of said monomer filling station.

3. The assembly of claim 2, wherein said cartridge further includes a ramp extending within said internal cavity and adapted to direct mold parts by gravity to said cartridge open end.

4. The assembly of claim 3 and further comprising an oscillating slot into which said cartridge is mounted at said monomer filling station, said oscillating slot located between said cartridge open end and said exit chute, said oscillating slot movable in a back and forth motion in the direction of said cartridge open bottom, whereby said mold parts fall by gravity into said slot from said cartridge and are moved by the oscillating motion toward said exit chute open top.

5. The assembly of claim 4, and further comprising a piston operable to strike a mold part in said oscillating slot whereby said mold part is directed into said exit chute open top.

* * * * *